United States Patent
Fields, II

(10) Patent No.: US 6,295,757 B1
(45) Date of Patent: Oct. 2, 2001

(54) CHEMICAL APPLICATION SYSTEM

(76) Inventor: Jack H. Fields, II, 2019 Brentwood Dr., Milan, TN (US) 38358

(*) Notice: Subject to any disclaimer, the term of this patent is extended or adjusted under 35 U.S.C. 154(b) by 0 days.

(21) Appl. No.: 09/440,036

(22) Filed: Nov. 12, 1999

(51) Int. Cl.[7] ................................................. A01B 39/18
(52) U.S. Cl. ............................................. 47/1.5; 401/197
(58) Field of Search ............................... 47/1.5; 239/373; 401/197, 209

(56) References Cited

U.S. PATENT DOCUMENTS

| | | | | |
|---|---|---|---|---|
| 1,522,172 | * | 1/1925 | Asbill | 239/374 |
| 1,578,129 | * | 3/1926 | Jacobson | 222/608 |
| 2,951,314 | * | 9/1960 | Laughlin | 47/1.5 |
| 3,295,721 | * | 1/1967 | Hibbard | 222/51 |
| 3,373,938 | * | 3/1968 | Sweet | 239/148 |
| 3,560,102 | * | 2/1971 | Wetzel | 401/218 |
| 3,702,739 | * | 11/1972 | Rentfrow | 401/197 |
| 4,483,486 | * | 11/1984 | Magda | 239/663 |
| 4,893,751 | * | 1/1990 | Armstrong | 239/150 |
| 5,836,519 | * | 11/1998 | Brown | 239/373 |
| 6,190,077 | * | 2/2001 | Newson | 401/192 |

* cited by examiner

*Primary Examiner*—Charles T. Jordan
*Assistant Examiner*—Francis T. Palo
(74) *Attorney, Agent, or Firm*—Michael S. Neustel

(57) ABSTRACT

A chemical application system for providing a cost effective and simple method of edging lawns and applying chemical to narrow areas. The inventive device includes a frame having at least one handle, a reservoir attached to the frame for storing a volume of fluid, a pump attached to the reservoir, and a dispensing wheel rotatably attached to the frame and fluidly connected to the reservoir. The dispensing wheel is comprised of center chamber rotatably attached to the frame and fluidly connected by a hose. A plurality of dispensing tube extend radially from the center chamber toward an outer rim thereby fluidly connected to a corresponding number of nozzles within the outer rim. An outer member comprised of an absorbent material, such as sponge, is secured about the outer portion of the outer rim for receiving and absorbing the chemical mixture dispensed from the nozzles. The chemical mixture eventually absorbs through the entire outer member so that when the dispensing wheel is rolled along a ground surface, a portion of the chemical mixture within the outer member is released upon the foliage that comes in contact with the outer member. The outer member may be comprised of various cross section designs depending upon the particular situation being utilized. An optional spray wand may be fluidly connected to the reservoir for allowing hand spraying if desired.

19 Claims, 3 Drawing Sheets

CHEMICAL APPLICATION SYSTEM

BACKGROUND OF THE INVENTION

1. Field of the Invention

The present invention relates generally to chemical applicators and more specifically it relates to a chemical application system for providing a cost effective and simple method of edging lawns and applying chemical to narrow areas.

Homeowners often times desire to "edge" their lawns for preventing the growth of grass and weeds adjacent cement or other structures. One method of edging the grass requires a rotary blade structure that physically digs the ground adjacent the cement or other structure creating a trail of debris which is undesirable. Conventional chemical applicator systems do not allow the application of chemical in a narrow area to limit killing of grass and weeds in a desired area. Hence, there is a need for a chemical application system that applies chemical in narrow defined areas without damaging or killing surrounding vegetation.

2. Description of the Prior Art

Chemical applicators have been in use for years. Typically, a chemical applicator is comprised of a storage reservoir for storing a mixture of the chemical, a pump attached to the storage reservoir for either applying air pressure into the storage reservoir or for drawing the chemical mixture from within, and a nozzle attached to the storage reservoir by a length of hose for dispersing the chemical mixture.

As stated previously, conventional chemical applicators are fine for the duties they are designed—spraying broad areas of vegetation. However, conventional chemical applicators are not suitable for applying a chemical mixture to a narrow and defined area so as to prevent damaging or killing surrounding vegetation.

Examples of attempted chemical applicators include U.S. Pat. No. 1,578,129 to Jacobson; U.S. Pat. No. 3,373,938 to Sweet; U.S. Pat. No. 4,483,486 to Magda; U.S. Pat. No. 4,893,751 to Armstrong; U.S. Pat. No. 5,836,519 to Brown which are all illustrative of such prior art.

Jacobson (U.S. Pat. No. 1,578,129) discloses a spraying device. More specifically, Jacobson teaches a tank having an inlet means for placing the interior of the tank under pressure, an annular flexible receptacle having an outlet extending through the tank, the receptacle being disposed within the tank adjacent the entire perimeter thereof, and a means engageable with a rod whereby the tank may be wheeled to various locations.

Sweet (U.S. Pat. No. 3,373,938) discloses a boom directed spray marking device. Sweet teaches a nozzle-supporting boom mounted on a portable wheeled frame carrying a paint storage tank and a self-contained source of air pressure.

Magda (U.S. Pat. No. 4,483,486) discloses a method and apparatus for treating lawns with both granular and liquid treatment materials. Armstrong (U.S. Pat. No. 4,893,751) discloses a carbon dioxide powered striping machine for painting long term parking surfaces. Brown (U.S. Pat. No. 5,836,519) discloses a portable wheeled spraying apparatus having an adjustable handle.

While these devices may be suitable for the particular purpose to which they address, they are not as suitable for providing a cost effective and simple method of edging lawns and applying chemical to narrow areas. Conventional sprayer devices do not allow for spraying within narrow areas without damaging surrounding vegetation. Conventional sprayer devices also create a mist of the chemical that the user inhales which can be unhealthy for the user over extended periods of time.

In these respects, the chemical application system according to the present invention substantially departs from the conventional concepts and designs of the prior art, and in so doing provides an apparatus primarily developed for the purpose of providing a cost effective and simple method of edging lawns and applying chemical to narrow areas.

SUMMARY OF THE INVENTION

In view of the foregoing disadvantages inherent in the known types of sprayer devices now present in the prior art, the present invention provides a new chemical application system construction wherein the same can be utilized for providing a cost effective and simple method of edging lawns and applying chemical to narrow areas.

The general purpose of the present invention, which will be described subsequently in greater detail, is to provide a new chemical application system that has many of the advantages of the sprayer devices mentioned heretofore and many novel features that result in a new chemical application system which is not anticipated, rendered obvious, suggested, or even implied by any of the prior art sprayer devices, either alone or in any combination thereof.

To attain this, the present invention generally comprises a frame having at least one handle, a reservoir attached to the frame for storing a volume of fluid, a pump attached to the reservoir, and a dispensing wheel rotatably attached to the frame and fluidly connected to the reservoir. The dispensing wheel is comprised of a center chamber rotatably attached to the frame and fluidly connected by a hose. A plurality of dispensing tube extend radially from the center chamber toward an outer rim thereby fluidly connected to a corresponding number of nozzles within the outer rim. An outer member comprised of an absorbent material, such as sponge, is secured about the outer portion of the outer rim for receiving and absorbing the chemical mixture dispensed from the nozzles. The chemical mixture eventually absorbs through the entire outer member so that when the dispensing wheel is rolled along a ground surface, a portion of the chemical mixture within the outer member is released upon the foliage that comes in contact with the outer member. The outer member may be comprised of various cross section designs depending upon the particular situation being utilized. An optional spray wand may be fluidly connected to the reservoir for allowing hand spraying if desired.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a chemical application system that will overcome the shortcomings of the prior art devices.

Another object is to provide a chemical application system that applies a chemical mixture to a defined area.

An additional object is to provide a chemical application system that provides a cost effective and simple method of edging lawns and applying chemical to narrow areas.

A further object is to provide a chemical application system that provides increased efficiency of application of the chemical to plants compared to conventional chemical applicators.

Another object is to provide a chemical application system that does damage or kill surrounding foliage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
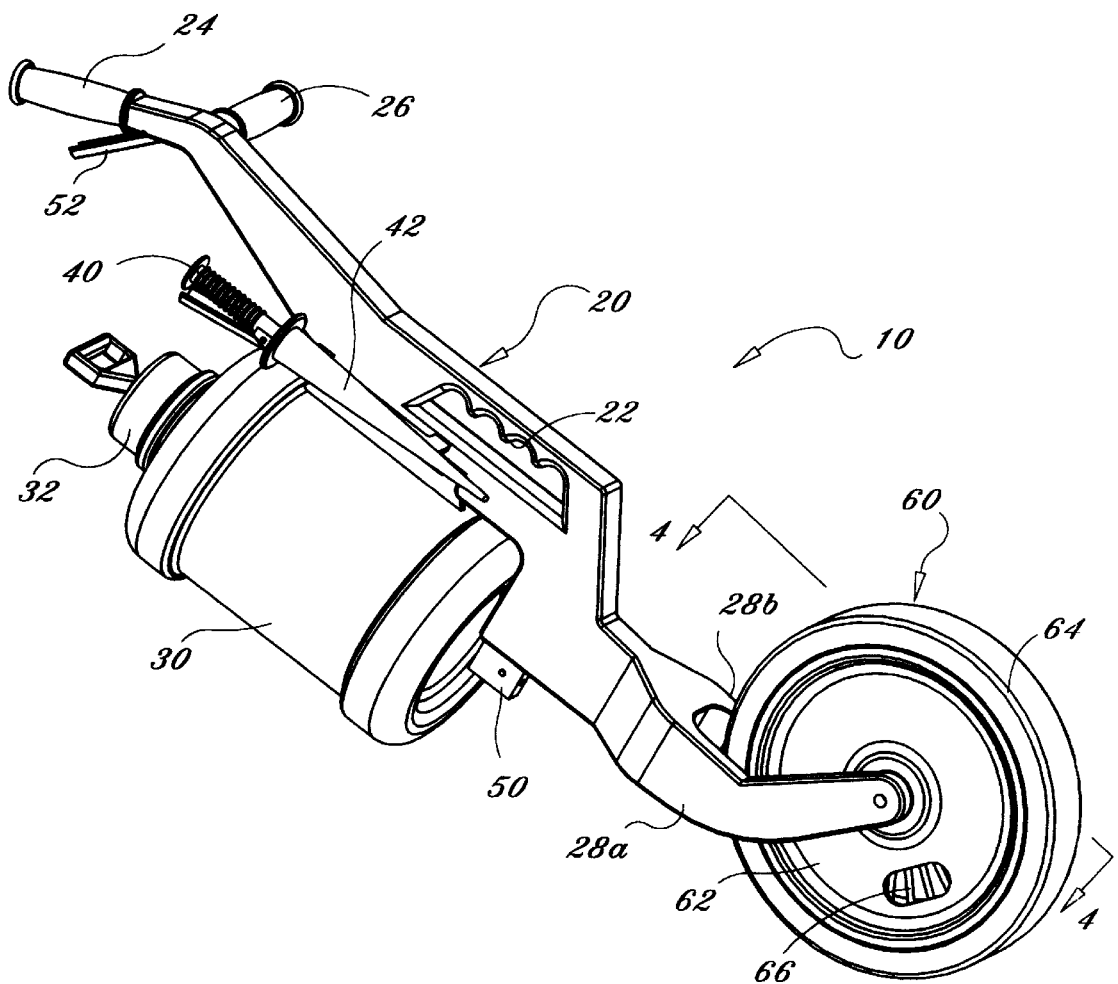
FIG. 1 is an upper perspective view of the present invention.

Turning now descriptively to the drawings, in which similar reference characters denote similar elements throughout the several views, FIGS. 1 through 6 illustrate a chemical application system 10, which comprises a frame 20 having at least one handle, a reservoir 30 attached to the frame 20 for storing a volume of fluid, a pump 32 attached to the reservoir 30, and a dispensing wheel 60 rotatably attached to the frame 20 and fluidly connected to the reservoir 30. The dispensing wheel 60 is comprised of center chamber 70 rotatably attached to the frame 20 and fluidly connected by a hose. A plurality of dispensing tube extend radially from the center chamber 70 toward an outer rim 62 thereby fluidly connected to a corresponding number of nozzles 68 within the outer rim 62. An outer member 64 comprised of an absorbent material, such as sponge, is secured about the outer portion of the outer rim 62 for receiving and absorbing the chemical mixture dispensed from the nozzles 68. The chemical mixture eventually absorbs through the entire outer member 64 so that when the dispensing wheel 60 is rolled along a ground surface, a portion of the chemical mixture within the outer member 64 is released upon the foliage that comes in contact with the outer member 64. The outer member 64 may be comprised of various cross section designs depending upon the particular situation being utilized. An optional spray wand 40 may be fluidly connected to the reservoir 30 for allowing hand spraying if desired.

Figure 2:
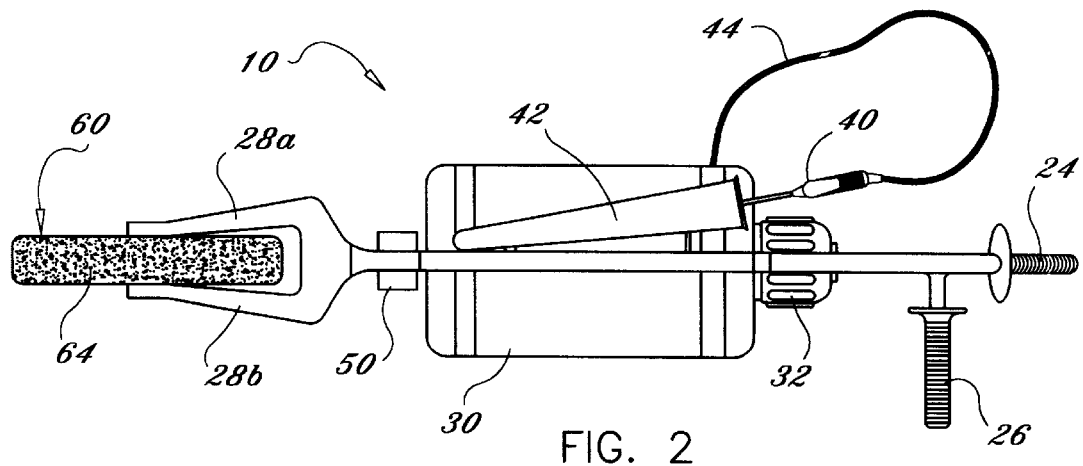
FIG. 2 is a top view of the present invention.
Figure 3:
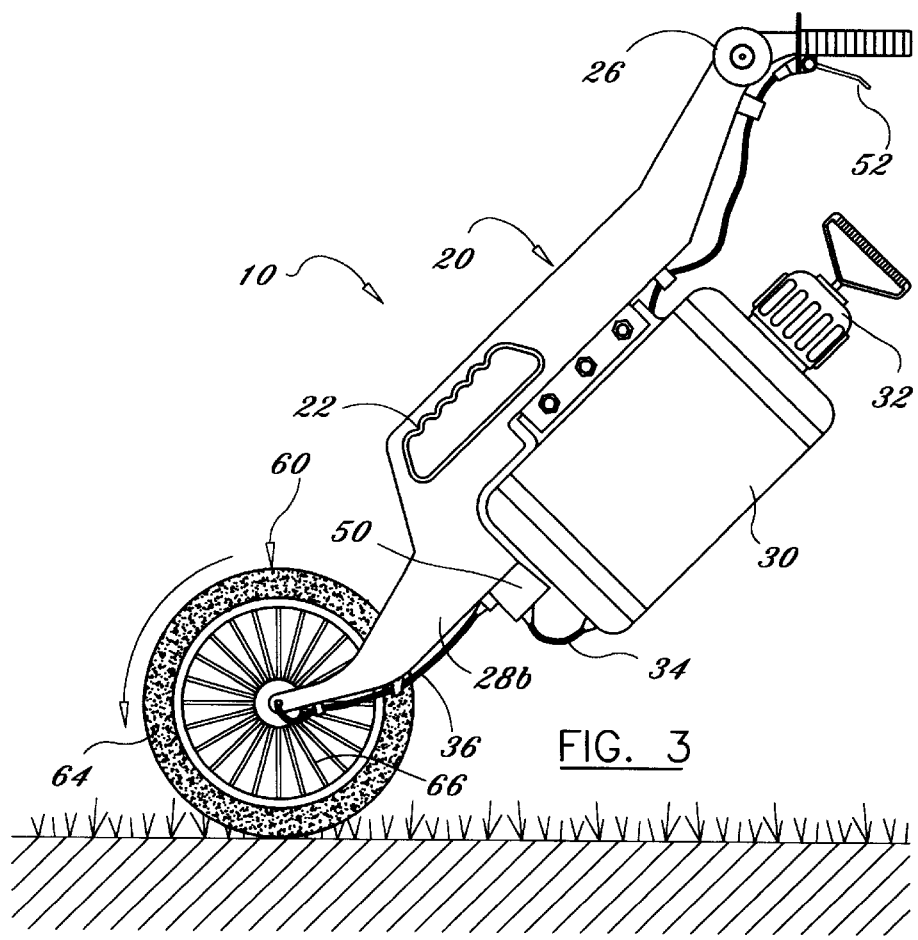
FIG. 3 is a side view of the present invention shown engaging a ground surface and foliage.

As best shown in FIGS. 1 through 3 of the drawings, the frame 20 is an elongated structure. The frame 20 may be comprised of any well-known material such as plastic, composite or metal.

As best shown in FIG. 3 of the drawings, the frame 20 preferably includes a center handle 22. The center handle 22 is preferably formed within a central portion of the frame 20. In addition, the center handle 22 preferably includes a plurality of grooves that correspond with the fingers of a user for increasing the grasping of the center handle 22.

As shown in FIGS. 1 and 2 of the drawings, a first handle 24 is preferably attached to an end of the frame 20 along a longitudinal axis of the frame 20. The first handle 24 preferably includes a gripping portion for allowing an individual to grasp during operation of the present invention. A second handle 26 is secured to the frame 20 orthogonally to the first handle 24 for grasping by another hand of the user during operation of the present invention as best shown in FIG. 2 of the drawings.

As best shown in FIG. 2 of the drawings, a pair of front brackets 28a–b extend from an end of the frame 20 opposite of the handles 24, 26. The dispensing wheel 60 is rotatably attached between the front brackets 28a–b as shown in FIG. 3 of the drawings.

As shown in FIGS. 1 through 3 of the figures, the reservoir 30 is attached to the middle portion of the frame 20 by conventional means. The reservoir 30 is capable of storing a volume of fluid such as a chemical mixture. A pump 32 is attached to the reservoir 30 as best shown in FIG. 3 of the drawings. The pump 32 is preferably manually operated, however electrical and fuel powered pumps 32 may be utilized. The pump 32 is preferably a pump 32 that pressurizes the interior air pressure within the reservoir 30, however the pump 32 may be a drawing pump 32 which are well-known in the art. It can be appreciated that the pump 32 may be comprised of any well-known pump 32 device or system.

A first hose 34 is fluidly connected to a lower portion of the reservoir 30 for receiving the fluid from within the reservoir 30. The first hose 34 may be connected to the pump 32 if the pump 32 is a drawing style of pump 32. A flow valve 50 is attached to the frame 20 or the reservoir 30 as shown in FIG. 3 of the drawings. The flow valve 50 is fluidly connected to the first hose 34 and controls the flow of fluid from the reservoir 30 to the dispensing wheel 60.

As shown in FIGS. 1 and 3 of the drawings, a trigger switch 52 is pivotally attached to the frame 20 adjacent the handles 24, 26. The trigger switch 52 is mechanically connected to the flow valve 50 by a length of cable or other structure for allowing manual control of the flow of fluid from the reservoir 30 into the dispensing wheel 60.

As shown in FIGS. 1 and 2 of the drawings, a spray wand 40 may be fluidly connected to the reservoir 30 by a wand hose 44. A holster 42 is preferably attached to the frame 20 or the reservoir 30 for receiving the spray wand 40 during non-use. The spray wand 40 may be utilized to do broad spot spraying instead of using the dispensing wheel 60 to apply the fluid or chemical mixture.

As shown in FIG. 3 of the drawings, a second hose 36 is fluidly connected between the dispensing wheel 60 and the flow valve 50. The second hose 36 receives the fluid released from the flow valve 50 due to manipulation of the trigger switch 52.

Figure 4:
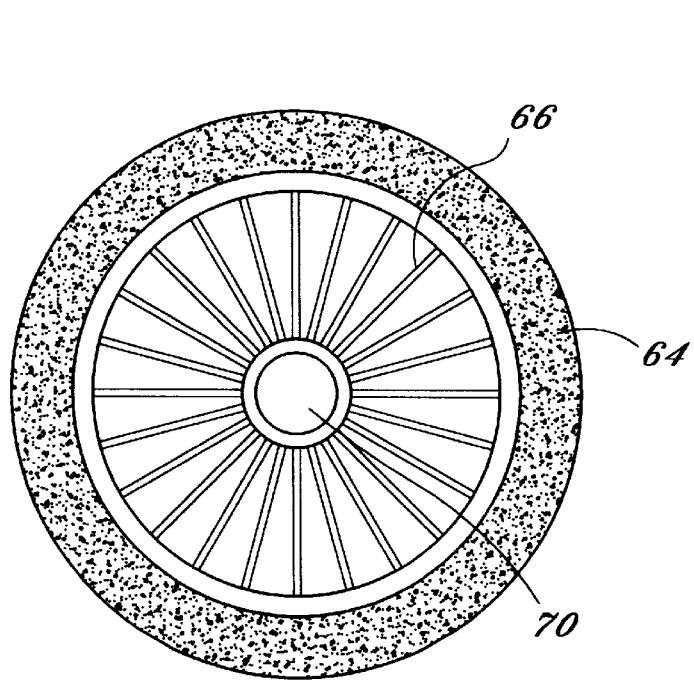
FIG. 4 is a cross sectional view taken along line 4—4 of FIG. 1.
Figure 5:
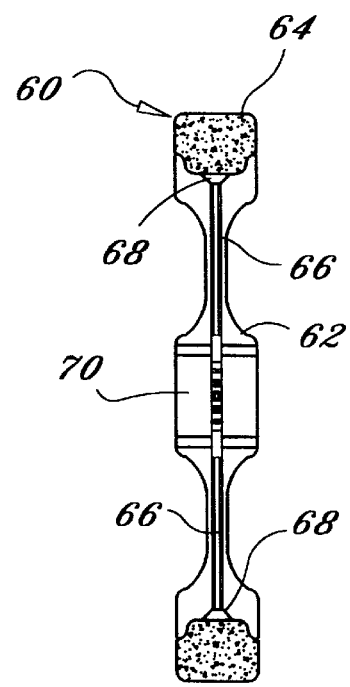
FIG. 5 is a cutaway view of the spray wheel.

As shown in FIGS. 1, 3, 4 and 5 of the drawings, the dispensing wheel 60 is comprised of a rim 62 and a center chamber 70. The center chamber 70 is rotatably attached between the front brackets 28*a*–*b* of the frame 20. The center chamber 70 is a sealed chamber that is fluidly connected to the second hose 36 for receiving the fluid from the reservoir 30. As shown in FIG. 5 of the drawings, the center chamber 70 preferably is cylindrical shaped, however any well-known shape may be utilized.

As shown in FIGS. 4 and 5 of the drawings, a plurality of dispensing tubes 66 are fluidly connected to the center chamber 70. The dispensing tubes 66 extend radially from the center chamber 70 and are attached to the inner portion of the rim 62. A plurality of nozzles 68 positioned within the rim 62 are fluidly connected to the dispensing tubes 66 for receiving the fluid from the dispensing tubes 66 as shown in FIG. 5 of the drawings. The nozzles 68 may be comprised of any well known nozzle or may simply be an opening for dispensing the fluid from the dispensing tubes 66.

Figure 6:
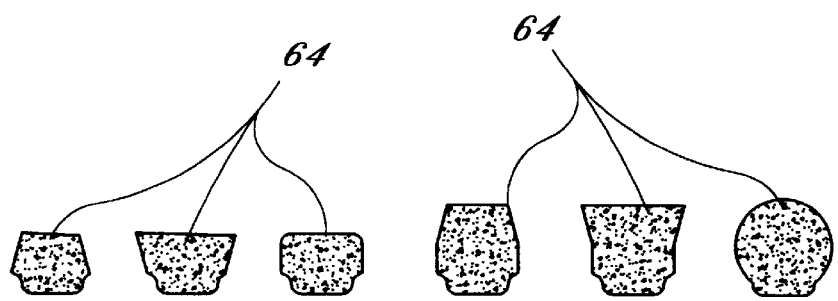
FIG. 6 is a cutaway view of the various possible designs of the outer member surrounding the dispensing wheel.

As shown in FIGS. 1, 3, 4 and 5 of the drawings, the outer member 64 is attached about the outside portion of the rim 62. The outer member 64 is comprised of an absorbent material for absorbing the fluid receiving from the dispensing tubes 66. The absorbent material may be comprised of a sponge-like material for receiving and dispensing the fluid upon foliage that engage the outer member 64. The outer member 64 may have various cross-sectional shapes as shown in FIG. 6 of the drawings, for accommodating various uses. The various designs of the outer member 64 may be utilized by simply removing the installed outer member 64 and reinstalling the new outer member 64.

In use, the user fills the reservoir 30 with the chemical mixture or other fluid desired. The user then pressurizes the reservoir 30 by manually pumping the pump 32. The user then grasps the first handle 24 and the second handle 26 for elevating a portion of the frame 20. The user then pushes the frame 20 so that the dispensing wheel 60 rolls upon the ground surface and foliage as shown in FIG. 3 of the drawings. The user then manipulates the trigger switch 52 so that the flow valve 50 is opened thereby allowing the fluid within the reservoir 30 to enter the second hose 36 and then enter the center chamber 70. The pressurized fluid is then forced from the center chamber 70 into the dispensing tubes 66 where it is received by the outer member 64 from the plurality of nozzles 68 attached to the dispensing tube. The fluid then is absorbed into the outer member 64 first through the inner portions of the rim 62, then through the middle portion of the outer member 64 and finally to the outer surface portions of the outer member 64. As the dispensing wheel 60 rolls upon the ground and foliage, as the outer member 64 engages plants a portion of the fluid leaves the outer member 64 and attaches directly to the plants engaged. The user may utilize the spray wand 40 for broader less defined areas. When finished, the user simply releases the trigger switch 52 thereby closing the flow valve 50 that terminates fluid flow to the outer member 64.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chemical application system, comprising:

a frame;

a reservoir attached to said frame capable of storing a volume of fluid;

a pump means attached to said reservoir; and a dispensing wheel rotatably attached to said frame and fluidly connected to said reservoir for dispensing fluid from said reservoir directly upon foliage that engages said dispensing wheel;

wherein said dispensing wheel comprises:

a center chamber rotatably attached to said frame and fluidly connected to said reservoir;

a plurality of dispensing tubes fluidly extending from said center chamber; and a rim attached to the distal ends of said plurality of dispensing tubes, wherein a plurality of nozzles within said rim are fluidly connected to said plurality of dispensing tubes.

2. The chemical application system of claim 1, wherein said dispensing wheel further includes an outer member comprised of an absorbent material that surrounds said rim.

3. The chemical application system of claim 2, wherein said outer member is comprised of a sponge-like material.

4. The chemical application system of claim 1, including a control means for allowing an individual to control the flow of fluid from said reservoir to said dispensing wheel.

5. The chemical application system of claim 4, wherein said control means is comprised of:

a flow valve fluidly connected between said reservoir and said dispensing wheel; and a trigger means mechanically connected to said flow valve for allowing the user to manually control said flow valve.

6. The chemical application system of claim 1, including a first handle attached to said frame.

7. The chemical application system of claim 6, including a second handle attached to said frame orthogonal to said first handle.

8. The chemical application system of claim 1, wherein said frame includes a center handle.

9. The chemical application system of claim 1, wherein said frame is comprised of an elongated structure.

10. A chemical application system, comprising:

a frame;

a reservoir attached to said frame capable of storing a volume of fluid;

a pump means attached to said reservoir;

a spray wand fluidly connected to said reservoir; and a dispensing wheel rotatably attached to said frame and fluidly connected to said reservoir for dispensing fluid from said reservoir directly upon foliage that engages said dispensing wheel.

11. The chemical application system of claim 10, wherein said dispensing wheel comprises:

a center chamber rotatably attached to said frame and fluidly connected to said reservoir;

a plurality of dispensing tubes fluidly extending from said center chamber; and a rim attached to the distal ends of said plurality of dispensing tubes, wherein a plurality of nozzles within said rim are fluidly connected to said plurality of dispensing tubes.

12. The chemical application system of claim 10, wherein said dispensing wheel further includes an outer member comprised of an absorbent material that surrounds said rim.

13. The chemical application system of claim 12, wherein said outer member is comprised of a sponge-like material.

14. The chemical application system of claim 10, including a control means for allowing an individual to control the flow of fluid from said reservoir to said dispensing wheel.

15. The chemical application system of claim 14, wherein said control means is comprised of:

a flow valve fluidly connected between said reservoir and said dispensing wheel; and a trigger means mechanically connected to said flow valve for allowing the user to manually control said flow valve.

16. The chemical application system of claim 10, including a first handle attached to said frame.

17. The chemical application system of claim 16, including a second handle attached to said frame orthogonal to said first handle.

18. The chemical application system of claim 10, wherein said frame includes a center handle.

19. The chemical application system of claim 10, wherein said frame is comprised of an elongated structure.

* * * * *